Patented Oct. 25, 1949

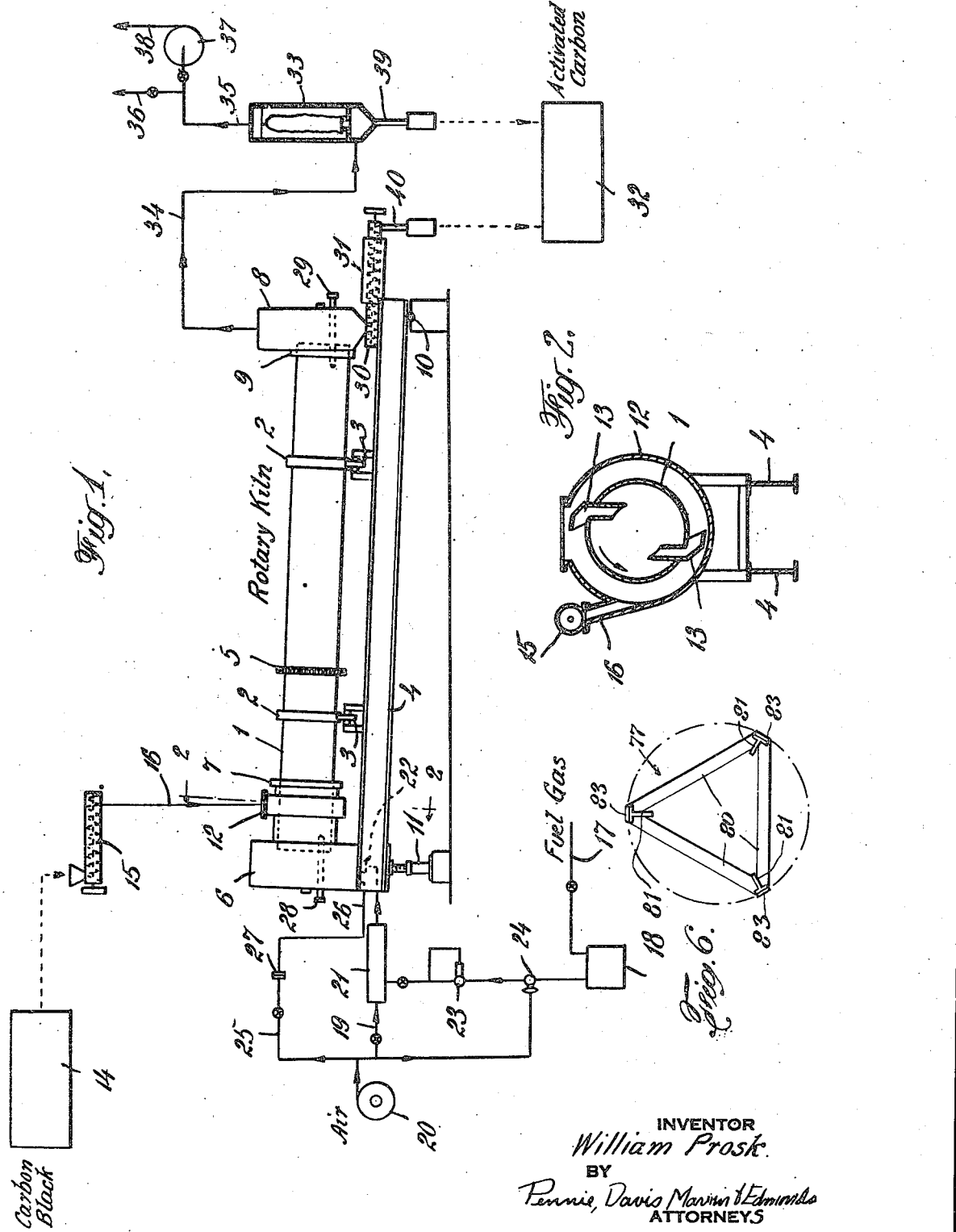

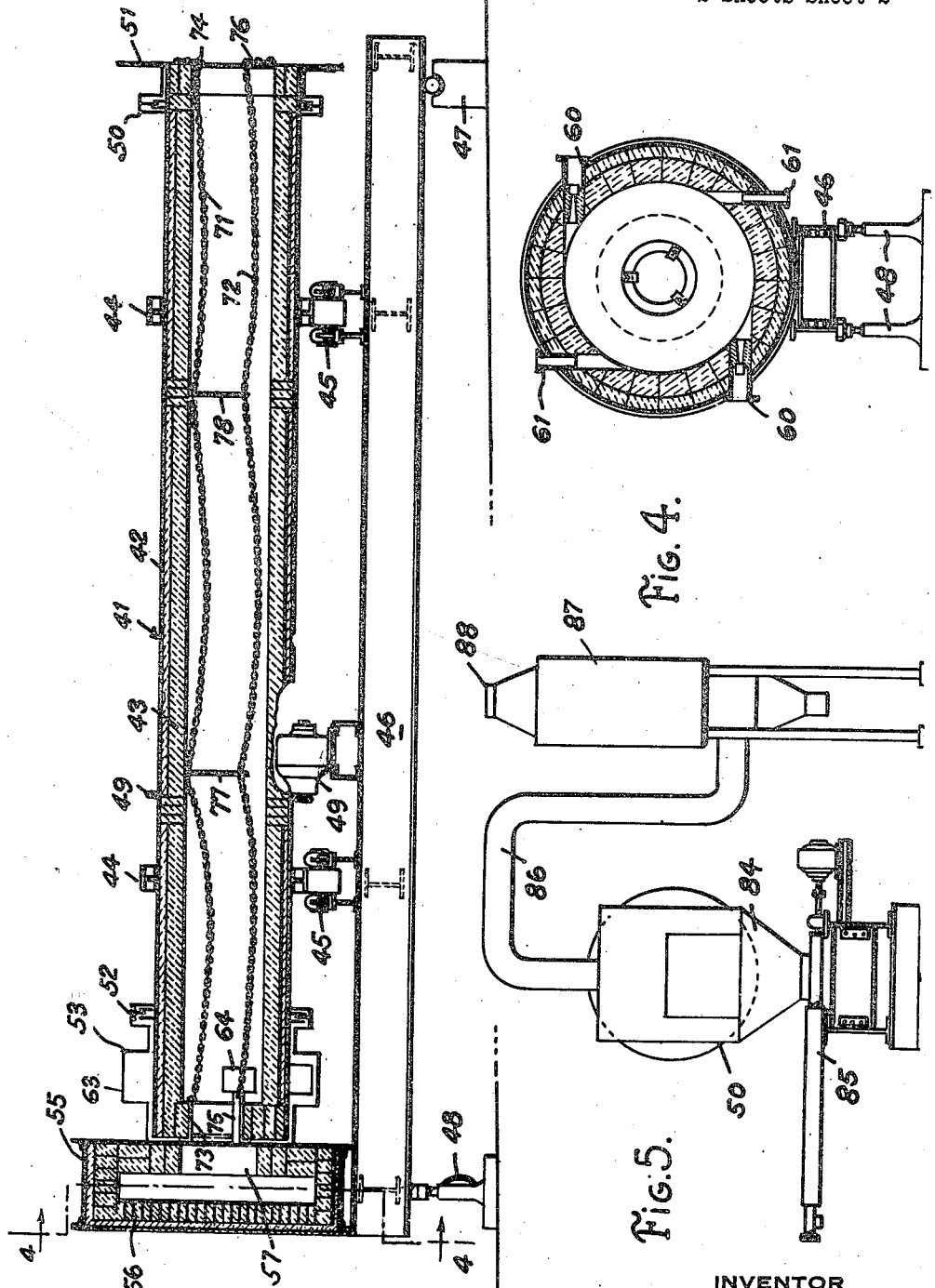

2,486,205

UNITED STATES PATENT OFFICE 2,486,205

MANUFACTURE OF ACTIVATED CARBON

William Prosk, Niagara Falls, N. Y., assignor to Mathieson Chemical Corporation, a corporation of Virginia Application September 6, 1945, Serial No. 614,725

1 Claim. (Cl. 252—445)

My invention relates to the production of activated carbon by oxidation of carbon, especially channel carbon black, or equivalent carbon. Specifically, my invention provides means and a method for effecting a form of agitation of the activated carbon undergoing oxidation which is peculiarly advantageous in this connection. My invention includes improvements in apparatus and improvements in process.

The efficiency of the oxidation of channel carbon black depends, in large measure, upon the uniform exposure of the whole of the processed carbon black to uniform conditions of oxidation. And, the carbon black and the solid products of reaction exhibit at least two properties which impede realization of this requirement. First, the carbon black is in an extremely fine state of subdivision and is, initially, readily suspended in the oxidizing atmosphere, for example, either by rapid movements of gas currents therein or by any mechanical agitation tending to lift or throw the carbon black into the oxidizing atmosphere. Second, the charge undergoing oxidation becomes quite sticky while at reaction temperature. The reaction can be carried out by exposing the carbon black to the oxidizing atmosphere in thin layers, say ¼" in thickness or less, undisturbed during the oxidation, but, while such operations can be conducted on a small scale, they are not easily expanded to a level appropriate for commercial production. With rotary rabbles or scrapers working a thicker layer on a horizontal hearth, agitation sufficient to effect the required exposure tends to result either in excessive losses, by way of entrainment in the oxidizing atmosphere, or in non-uniformity of exposure in that suspended material is moved through the kiln more rapidly than that progressed by the mechanical agitation. With conventional rotary kilns, unless the rate of throughput is reduced well below limits I would regard as economic loading, the required exposure is not obtained or entrainment losses become excessive.

In one aspect, my invention provides an improved process and apparatus for manufacture of such activated carbon products characterized particularly by the form of agitation of the carbon black and solid reaction products while exposed to the oxidizing atmosphere.

I carry out the oxidation of the carbon black, in practicing my invention, in a rotary kiln and I effect the necessary agitation of the carbon black and solid reaction products, while maintaining an economic rate of operation, by providing one or more lengths of chain extending longitudinally through the kiln and supported on means providing the required slack, for example, a slack approximating or somewhat less than one-fourth of the inside diameter of the kiln. For example, three chains on triangularly spaced attachments at the ends of the kiln, and with one or more intermediate attachments, will provide a very effective utilization of the chains. The slack in the portion of chain between attachments is most effective when approximately one-fourth the diameter of the kiln.

The kiln is provided with appropriate hoods and seals to permit close control of the oxygen concentration in the kiln. Otherwise, the kiln may be of conventional construction, unlined if externally fired or preferably with refractory lining when internally fired, the kiln being charged at the high end and the charge being progressed through the kiln to the low end by revolution of the kiln which, of course, slopes towards the discharge end. In the conventional rotary kiln, without the arrangement of chain characteristic of my invention, the solid charge remains substantially motionless toward one side of the middle of the bottom of the kiln and the latter simply slides out from under the charge without substantial agitation. In a rotary kiln embodying my invention, with one or more lengths of chain extending through the kiln with suitable slack and with little freedom of motion with respect to the kiln wall, the solid charge is raked and agitated by the revolution of the kiln as the chain or chains move through it, with consequent exposure of almost continuously new surfaces, but without exposing the carbon to the oxidizing atmosphere any more than necessary. The solid charge rides along the bottom third or so of the kiln and in this region the chain or chains, arranged as described, are themselves riding on the kiln wall. As the chain or chains approach the edge of the mass, riding somewhat high in the direction of rotation of the kiln, they too disengage from the wall and thus avoid any tendency toward carrying parts of the mass beyond the line at which the charge reposes in the kiln which might otherwise involve excessive showering of parts of the charge through the gas currents moving through the kiln. The chain or chains are effective to secure the desired agitation both before and after the solid charge in the kiln assumes the sticky condition previously noted.

Thus, in carrying out the process of my invention, I charge channel carbon black by any suitable feeding device to the high end of a rotary kiln, I maintain an oxidizing atmosphere and a temperature of about 850°–1050° F. in the kiln. I revolve the kiln at a rate, with respect to its inclination, such that the retention time in the kiln approximates 10–60 minutes, I agitate the charge moving through the kiln by means of a chain or chains extending longitudinally through the kiln and secured at the ends to leave a slack approximating one-fourth, or not exceeding about one-fourth, the inside diameter of the kiln, and I discharge the activated carbon product of the reaction from the low end of the kiln.

The apparatus of my invention comprises a rotary kiln, means for heating the kiln and for controlling the atmosphere in the kiln, means for charging carbon black to the high end and for discharging activated carbon from the low end of the kiln, and chain extending longitudinally through the kiln and secured at the ends to leave a slack approximating one-fourth, or not exceeding about one-fourth the inside diameter of the kiln.

I have illustrated apparatus embodying my invention and adapted for carrying out the process of my invention in the accompanying drawings. These drawings are diagrammatic and conventional although they illustrate the apparatus generally to scale. In the drawings:

Fig. 1 is an elevation of the kiln with appurtenances and their relation to the kiln indicated as in a flow diagram.

Fig. 2 is a view along line 2—2 of Fig. 1;

Fig. 3 is an elevation, with parts in section, of a kiln similar to that of Fig. 1;

Fig. 4 is a view along line 4—4 of Fig. 3;

Fig. 5 is an elevation facing the right hand end view of Fig. 3 showing apparatus omitted from Fig. 3, and Fig. 6 shows a detail of the apparatus of Fig. 3.

Referring to the drawings: The kiln comprises a refractory lined steel cylinder 1, supported by bearing rings 2 running in rollers 3 in turn supported by "I" beams 4, provided with a ring gear 5 through which the kiln is revolved, and extending at its upper end into hood 6 through seal 7 and its lower end into hood 8 through seal 9. The lower ends of the "I" beams 4 are supported on a pivotal base 10 and the upper ends are supported on a pair of jacks 11 to permit adjustment of the inclination of the kiln. A feeder housing 12 is positioned between the hood 6 and the seal 7. The kiln itself extends through this feeder housing and seal into the hood 6. However, a pair of scoops 13, arranged to discharge into the kiln, are secured to the kiln at a point such that they revolve within the feeder housing 12. Carbon black of any suitable character from a supply receptacle 14 is forced by means of the screw feeder and seal 15 into the feeder housing 12 through connection 16 where it is picked up and charged into the kiln by the scoops 13 as they revolve with the kiln. The hood 6 serves as a chamber for combustion of the fuel burned to maintain the required temperature in the kiln. For example, fuel gas, supplied through connection 17 and meter 18, and air, supplied through connection 19 by means of blower 20, are mixed in a mixing chamber 21 and the mixture is then introduced into the hood 6 through burners 22. 23 designates a pressure regulating valve in the gas supply connection and 24 designates a protection valve for automatically shutting off the gas supply in the event of failure of air pressure. Additional air to maintain the required oxygen concentration in the kiln is supplied to the hood through connections 25 and 26 including flow meter 27. Thermocouples for reporting the temperature at the two ends of the kiln are indicated at 28 and 29. The primary separation of the solid reaction product and the effluent gas mixture is effected in the hood 8. The bulk of the solid reaction product falls through the hood 8 into the screw conveyor and seal 30 through which it moves through the cooler 31 into the collection receptacle 32 through connection 40. The bulk of the remaining solid reaction product is recovered in the bag filter 33 to which the effluent gas mixture passes from the hood 8 through connection 34. The thus recovered solid reaction product is discharged through connection 39 into the receptacle 32. The gas mixture escaping from the bag filter 33, through connection 35, may pass directly to a stack through connection 36, or may be exhausted by means of fan 37 discharging through connection 38. The receptacles 14 and 32 may be replaced by bag storage, in which event the carbon black is charged into the screw feeder and seal 15 from bags and the activated carbon product is collected in bags as it is discharged through connections 39 and 40.

Referring particularly to Figs. 3 to 6 of the accompanying drawings, the rotary kiln 41 comprises a shell 42 of steel with a refractory lining 43. The kiln is rotatably mounted on rings 44 running in rollers 45 supported on "I" beams 46, the ends at the right of which rest on the pivotal base 47 and the other ends on the jacks 48. The kiln is rotated by the power unit 49 which drives the usual ring gear 49'. The discharge end has a seal 50 for effecting an engagement with the hopper 51 (Fig. 5) and a seal 52 at the charge-entrance end where the kiln extends through the annular feed housing 53 which is rigidly secured to the combustion chamber 55, mounted in a fixed position on the "I" beams 46. The chamber 55 has a refractory lining 56 and an opening 57 coinciding with the inside of the kiln through which combustion gas flows into the kiln. Any suitable gaseous, liquid or atomized fuel is supplied to the combustion chamber through ports 60. Air for combustion and supplementary air, in the amount required for the treatment of the carbon black, may be supplied through the ports 61.

The carbon black is introduced into the feed housing 53 from a source, such as that shown in Fig. 1, and is deposited through the top 63, and by means of scoops 64, rotatable with the kiln, the carbon black is charged into the kiln.

In the form of my invention illustrated in Figs. 3 to 6, I use three chains in a triangularly disposed position within the kiln. Only chains 71 and 72 are shown in Fig. 2, but it is understood that the third chain is attached, as will be evident from Fig. 6, in the front section of the kiln, in a position corresponding to chain 72. Chain 71 is attached at one end to anchor bracket 73 and at the other end to anchor bracket 74. Chain 72 is attached at one end to anchor bracket 75 and at the other end to anchor bracket 76. The third chain is similarly attached. At suitable intermediate points, the triangular spacers 77 and 78, preferably of stainless steel, are mounted inside the refractory lining. As shown in Fig. 6, these spacers comprise three legs 80 welded together at the corners to form a triangular structure. At the corners chain brackets 81 are provided for attaching the chains to the spacers, and the exterior edge portions 83 provide a means for bearing against the refractory lining to hold the spacers in position. As shown, each spacer is located a third of the distance from one of the ends of the kiln and the chains attached thereto hang with three slack portions, somewhat like catenaries. The amount of slack in each portion is about, or somewhat less, than one-fourth the inside diameter of the kiln. Other arrangements of one or more chains may be used, provided they are of such length as to leave a slack approximating about one-fourth the inside diameter of the kiln. As an illustration of my invention, the kiln of Fig. 3 had an overall length of 25 feet, an outside diameter of 3 feet, and a diameter inside the refractory of 18 inches.

The apparatus arranged at the end of the kiln and shown in Fig. 5 comprises a receiving hood 84 into which the products of the kiln are discharged. The bulk of the carbon falls from the hood into the screw conveyor 85 from which it is forced into containers (not shown). The remaining carbon entrained in the gas passes through pipe 86 into the bag filter 87 where the bulk of the suspended solids is recovered and the effluent gas passes upward through port 88 to the atmosphere or to further separating apparatus (not shown) if required.

An operation illustrative of the practice of my invention in apparatus such as that illustrated and previously described is set forth below: Channel carbon black was supplied to the kiln at a rate of 30 lbs. per hour. Fuel gas with the air required for its combustion was burned at a rate sufficient to maintain a temperature approximating 1000° F. in the kiln. Additional air was introduced into the kiln so that the gas mixture in the kiln, as it first contacted the carbon black contained sufficient oxygen for combustion of a suitable proportion of the carbon. The actual linear velocity of the gas mixture through the kiln may approximate 3' per second. The kiln was revolved at a rate of 1–3 revolutions per minute regulated in connection with the inclination of the kiln, so that the retention time in the kiln was of the order of 20–40 minutes. About 10 lbs. per hour of the carbon was lost by oxidation. The temperature of the gas mixture leaving the discharge hood was approximately 600° F. and the temperature of the gas mixture leaving the bag filter was approximately 250° F.

I claim:

In the manufacture of activated carbon by moving a charge of channel carbon black through an enclosed downwardly inclined longitudinal chamber in which there is an oxidizing atmosphere and a temperature in the range of 850° F. to 1050° F. and agitating the charge by slow rotation of the chamber, the improvement which comprises raking the charge upwardly along the rising wall of the chamber with consequent exposure of new surfaces, and rolling the charge away from its raked position against the wall and downwardly into the chamber without showering the carbon into the space of the chamber, whereby the loss of carbon particles by entrainment in the oxidizing atmosphere is minimized.

WILLIAM PROSK.

REFERENCES CITED

The following references are of record in the file of this patent:

UNITED STATES PATENTS

| Number | Name | Date |
|---|---|---|
| 313,401 | Breer | Mar. 3, 1885 |
| 386,664 | Solvay | July 24, 1888 |
| 1,143,132 | Peacock | June 15, 1915 |
| 1,356,756 | Caps | Oct. 26, 1920 |
| 1,505,517 | Woodruff et al. | Aug. 19, 1924 |
| 1,591,235 | Rodman | July 6, 1926 |
| 1,597,208 | Naugle | Aug. 24, 1926 |
| 1,634,479 | Wickenden et al. | July 5, 1927 |
| 1,686,100 | Okell et al. | Oct. 2, 1928 |
| 1,843,941 | Begerow et al. | Feb. 9, 1932 |
| 2,144,251 | Bartholemew | Jan. 17, 1939 |